(12) United States Patent
Adachi et al.

(10) Patent No.: US 9,034,511 B2
(45) Date of Patent: May 19, 2015

(54) POWER STORAGE APPARATUS, CONNECTION APPARATUS, POWER STORAGE SYSTEM, ELECTRONIC DEVICE, MOTOR-DRIVEN VEHICLE, AND ELECTRIC POWER SYSTEM

(75) Inventors: Tatsuya Adachi, Fukushima (JP); Eiji Kumagai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 180 days.

(21) Appl. No.: 13/300,145

(22) Filed: Nov. 18, 2011

(65) Prior Publication Data
US 2012/0150375 A1 Jun. 14, 2012

(30) Foreign Application Priority Data
Dec. 9, 2010 (JP) ................. P2010-274381

(51) Int. Cl.
| | | |
|---|---|---|
| *H01M 6/42* | (2006.01) | |
| *H01M 2/34* | (2006.01) | |
| *H01M 10/48* | (2006.01) | |
| *H01M 10/42* | (2006.01) | |

(Continued)

(52) U.S. Cl.
CPC ........ *H01M 2/34* (2013.01); *H01M 2010/4271* (2013.01); *H01M 2/1066* (2013.01); *H01M 10/0525* (2013.01); *H01M 10/4207* (2013.01); *H01M 10/425* (2013.01); *H01M 10/482* (2013.01); *Y02T 10/7011* (2013.01); *H01H 1/20* (2013.01); *H01R 13/447* (2013.01); *H01R 31/08* (2013.01)

(58) Field of Classification Search
CPC ..... H01H 2009/065; H01H 9/06; H01H 9/52; H01R 13/629; H01R 13/64; H01M 10/4257; H01M 10/425; H01M 2/1066; H01M 2010/4271

USPC ........ 429/121–123, 138, 150–151, 153, 163, 429/167, 170, 178–179
See application file for complete search history.

(56) References Cited

U.S. PATENT DOCUMENTS 4,191,917 A * 3/1980 Brown et al. ................. 320/111
2006/0228919 A1* 10/2006 Marukawa et al. ........... 439/133

(Continued)

FOREIGN PATENT DOCUMENTS

| EP | 1153787 | 11/2001 |
|---|---|---|
| EP | 2106885 | 10/2009 |

(Continued)

OTHER PUBLICATIONS

"Toyota Industries Developing Solar-powered EV Charging Station," Tech-On!, retrieved online on Mar. 8, 2012, http://techon.nikkeibp.co.jpienglish/NEWS_EN/20091026/176889/?St. (2 pages).

(Continued)

*Primary Examiner* — Patrick Ryan
*Assistant Examiner* — Ben Lewis
(74) *Attorney, Agent, or Firm* — K&L Gates LLP (57) ABSTRACT

A power storage apparatus having a battery unit housed in a case includes external terminals of positive and negative poles for providing, from outside the case, electrical connection to corresponding positive and negative poles of the battery unit; and electronic parts, wherein only when a connection with the battery unit is cut from at least one of the external terminals of both the poles, the electronic parts can be accessed.

15 Claims, 10 Drawing Sheets

(51) Int. Cl.
    *H01M 2/10*     (2006.01)
    *H01M 10/0525*     (2010.01)
    *H01H 1/20*     (2006.01)
    *H01R 13/447*     (2006.01)
    *H01R 31/08*     (2006.01)

(56) References Cited

U.S. PATENT DOCUMENTS

| | | | |
|---|---|---|---|
| 2009/0051226 | A1 | 2/2009 | Marukawa et al. |
| 2010/0007481 | A1* | 1/2010 | Uchida ............... 340/455 |
| 2010/0259104 | A1 | 10/2010 | Winkelman |

FOREIGN PATENT DOCUMENTS

| | | |
|---|---|---|
| GB | 2341989 | 3/2000 |
| JP | 05-326056 | 12/1993 |
| JP | 09-139237 | 5/1997 |
| JP | 2002-343331 | 11/2002 |
| JP | 2007-200758 | 8/2007 |
| JP | 2008-243710 | 10/2008 |
| JP | 2009-113706 | 5/2009 |
| JP | 2009-284586 | 12/2009 |
| JP | 2010-184622 | 8/2010 |

OTHER PUBLICATIONS

European Patent Office, Extended European Search Report, issued in connection with European Patent Application No. 11008947.1, dated Mar. 16, 2012. (12 pages).
European Patent Office, Communication pursuant to Article 94(3) EPC issued in connection with European Patent Application No. 11008947.1, dated Mar. 18, 2013. (7 pages).
Japanese Office Action issued Jul. 22, 2014, for corresponding Japanese Appln. No. 2010-274381.
Reasons for refusal notice issued in connection with Japanese Patent Application No. 2010-274381, dated Oct. 28, 2014. (7 pages).
Japanese Office Action issued Oct. 28, 2014, for corresponding Japanese Appln. No. 2010-274381.

* cited by examiner

POWER STORAGE APPARATUS, CONNECTION APPARATUS, POWER STORAGE SYSTEM, ELECTRONIC DEVICE, MOTOR-DRIVEN VEHICLE, AND ELECTRIC POWER SYSTEM

CROSS REFERENCES TO RELATED APPLICATIONS

The present application claims priority to Japanese Priority Patent Application JP 2010-274381 filed in the Japan Patent Office on Dec. 9, 2010, the entire content of which is hereby incorporated by reference.

BACKGROUND

The present application relates to a power storage apparatus having a plurality of power storage elements housed in a case, to a connection apparatus that can be applied to the power storage apparatus, and to a power storage system, a motor-driven vehicle, an electronic device, and an electric power system that use electric power from the power storage apparatus.

In recent years, secondary batteries, such as lithium-ion batteries, have found a wide range of applications in power storage apparatuses for storing electric power, automobile batteries, and the like, in combination with new energy systems, such as solar batteries and wind power generation. In order to generate large output, in a case where many power storage elements, for example, unit batteries (also called cells, in the following description, simply referred to as batteries as appropriate) are used, a configuration in which a plurality of power storage modules are connected in series with one another is adopted. A power storage module is formed such that a plurality of (for example, eight) batteries are connected in parallel and/or in series with one another, thereby constituting a battery block. Many battery blocks are housed in an exterior case, and thus, a power storage module (also called an assembled battery) is formed.

As an example, the output voltage of the single body of the power storage apparatus is set at several tens of Volts. A plurality of such power storage apparatuses are connected in series with one another, so that an output voltage of several hundreds of Volts is obtained. In particular, in a case where a high voltage is generated as described above, it is necessary that consideration is given to the prevention of electric shock. A configuration is described in, for example, PTL 1 below, in which, to prevent electric shock when a battery for an automobile is to be replaced, an isolating switch is turned off when a positioning pin is fitted into a hole when a spent battery is to be replaced. When the isolating switch is turned off, supply of electricity to the connection terminal of a connector is shut off, and thereby safety is ensured.

SUMMARY

The disclosure disclosed in PTL 1 above uses the movement of an actuator that moves up and down when the battery is to be replaced. However, there is a problem in that the disclosure disclosed in PTL 1 does not apply to a power storage apparatus that does not have such an up/down mechanism. In addition, in a case where a plurality of power storage apparatuses are to be connected and used, a common controller is provided with respect to a plurality of power storage apparatuses. Communication is performed between a battery monitoring unit and a common controller, so that the charging operation, the discharging operation, and the like of each power storage apparatus are controlled by the controller.

An address for identification is assigned to each power storage apparatus for the purpose of a process in which a controller receives information, such as a voltage, from a plurality of power storage apparatuses and controls each power storage apparatus. The configuration of the power storage apparatus is made the same, and a unique address is set to each power storage apparatus by a user. If electronic parts for which setting of an address is performed are provided inside a case, it becomes necessary to open the lid of the case for the purpose of a setting operation of electronic parts, resulting in decreased work efficiency and electric shock. The same problem occurs also in a case where electronic parts are set through an opening provided in the case without opening the lid thereof. Therefore, exposing electronic parts outside the case is desirable from the viewpoint of work efficiency. However, with the configuration, also, if a voltage output terminal nearby is touched, there is a risk of electric shock, which is problematical in terms of safety.

Accordingly, an object of the present application is to provide a power storage apparatus that enables access to electronic parts from outside a case and further reliably enables the prevention of the risk of electric shock when a setting operation is performed for electronic parts, a connection apparatus that can be applied to the power storage apparatus, and a power storage system, an electronic device, a motor-driven vehicle, and an electric power system that use electric power from the power storage apparatus.

In order to solve the above-mentioned problems, a power storage apparatus of the present application is a power storage apparatus having a battery unit housed in a case, the power storage apparatus including: external terminals of positive and negative poles for providing, from outside the case, electrical connection to corresponding positive and negative poles of the battery unit; and electronic parts, wherein only when a connection with the battery unit is cut from at least one of the external terminals of both the poles, the electronic part can be accessed.

According to an embodiment, there is provided a power storage apparatus having a battery unit and electronic parts housed in a same case the power storage apparatus including: external terminals of positive and negative poles for providing, from outside the case, electrical connection to corresponding positive and negative poles of the battery unit; and a connection unit configured to switch a connected state between at least one of the external terminals of both the poles and the battery unit, wherein the connection unit enables the electronic parts to be accessed only when the connected state is a disconnected state.

According to another embodiment, there is provided a connection apparatus including: first and second conductors that are inserted into a power-supply line; a connection unit by which a state in which the first and second conductors contact with each other and a state in which at least one of the first and second conductors is separated from the other; and a cover that is formed integrally with a support part that supports the connection unit and that blocks access to the electronic parts in the vicinity of the first and second conductors.

According to at least one embodiment, a cover that is integral with a connection unit is designed to block access to electronic parts. To access electronic parts, the connection unit is pulled out so that the cover is removed. When the connection unit is pulled out, the connection between first and second conductors is cut, and a voltage is not output to an external terminal. Therefore, it is possible to prevent a risk of receiving an electrical shock from an external terminal.

Additional features and advantages are described herein, and will be apparent from the following Detailed Description and the figures.

DETAILED DESCRIPTION

The present application will be described below with reference to the drawings according to the embodiment.

"Overview of Power Storage Module"

In a case where many power storage elements, for example, secondary battery cells (hereinafter referred to as batteries) are to be used to generate large output, a configuration is adopted in which a plurality of power storage apparatuses (hereinafter referred to as power storage modules) are connected, and a control device is provided in common with respect to the plurality of power storage modules. Such a configuration will be referred to as a battery system. The power storage module is a unit in which a plurality of battery cells and a controller are combined.

Figure 1:
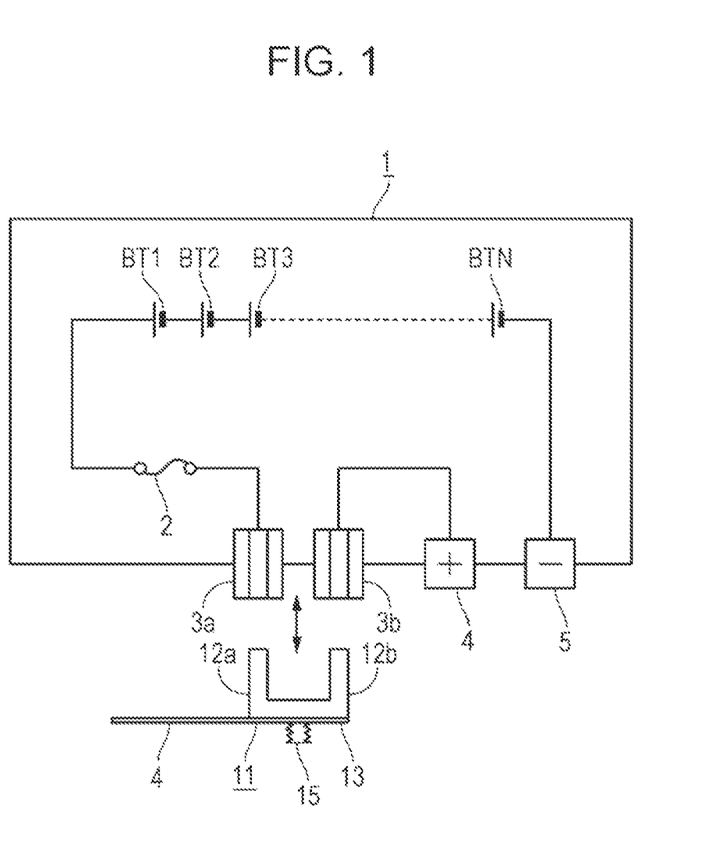
FIG. 1 is a block diagram illustrating the overview of a power storage module.

As shown in FIG. 1, a power storage module 1 has housed therein batteries BT1 to BTN that are connected in series with one another in a case. The terminals on the positive pole side of the batteries BT1 to BTN are connected to a connector 3a serving as a first conductor through a fuse. Another connector 3b is provided in the vicinity of the connector 3a. The connector 3b is connected to an external terminal 4 on the positive pole side. The terminals on the negative pole side of the batteries BT1 to BTN are connected to an external terminal 5 on the negative pole side. Inside the case, a metal plate for connection, for example, a bus bar, is used to make series connection between batteries or between battery blocks including a plurality of batteries. A bus bar is a metal in the shape of a long bar.

A detachable bus bar 11 is provided as a connection unit with respect to the connectors 3a and 3b. The bus bar 11 has a configuration in which a conduction plate is bent so as to have a pair of plate-shaped projections 12a and 12b and the base part of the conduction plate is mounted on one surface of a support plate 13. A cover 14 is formed as a result of one end of the support plate 13 being extended. Furthermore, a knob 15 is formed on the other surface of the support plate 13. The support plate 13 having the cover 14 and the knob 15 is, for example, a molded product of synthetic resin.

For example, the connector 3a and the 3b have a gap (slit) in which their spring contact plates are made to face each other. As a result of the plate-shaped projections 12a and 12b of the bus bar 11 being inserted in the gap of the connectors, the connector 3a and the connector 3b are connected (conduct) through the bus bar 11. On the other hand, as a result of the plate-shaped projections 12a and 12b of the bus bar 11 being pulled out from the gap of the connectors, the connector 3a and the connector 3b are disconnected (non-conduct). As described above, it is possible to switch between a connected state in which the bus bar 11 has been inserted into the connectors 3a and 3b and a non-connected state in which the bus bar 11 has been pulled out from the connectors 3a and 3b.

In FIG. 1, though the illustration is omitted, electronic parts for which, for example, setting of an address of a power storage module is performed, are arranged in the vicinity of the connectors 3a and 3b. In the connected state in which the bus bar 11 has been inserted into the connectors 3a and 3b, the cover 14 blocks the window on the front side of the operation surface of the electronic parts. That is, in the connected state, access to the electronic parts is blocked. On the other hand, when the bus bar 11 is pulled out from the connectors 3a and 3b, the window on the front side of the operation surface of the setting unit opens, making it possible to set, for example, the address of the power storage module by operating the operation surface through the window.

Only when the bus bar 11 is removed and the window on the front side of the operation surface is opened, access to the operation surface becomes possible, and a setting operation of electronic parts becomes possible. By performing a setting operation from outside the case, work efficiency can be improved when compared to operating electronic parts inside the case, and also safety can be increased. In particular, in a case where a plurality of power storage modules are connected in series with one another, the electrical potential of the internal circuit of the high-order power storage module becomes higher than the electrical potential of the internal circuit of the low-order power storage module as a whole. As a result of not providing electronic parts in the inside, safety can be improved. In addition, since a high voltage is not output to the external terminal 4, the risk of electric shock due to contact with the external terminal 4 at the time of a setting operation can be eliminated.

"Example of Power Storage Module"

Figure 2:
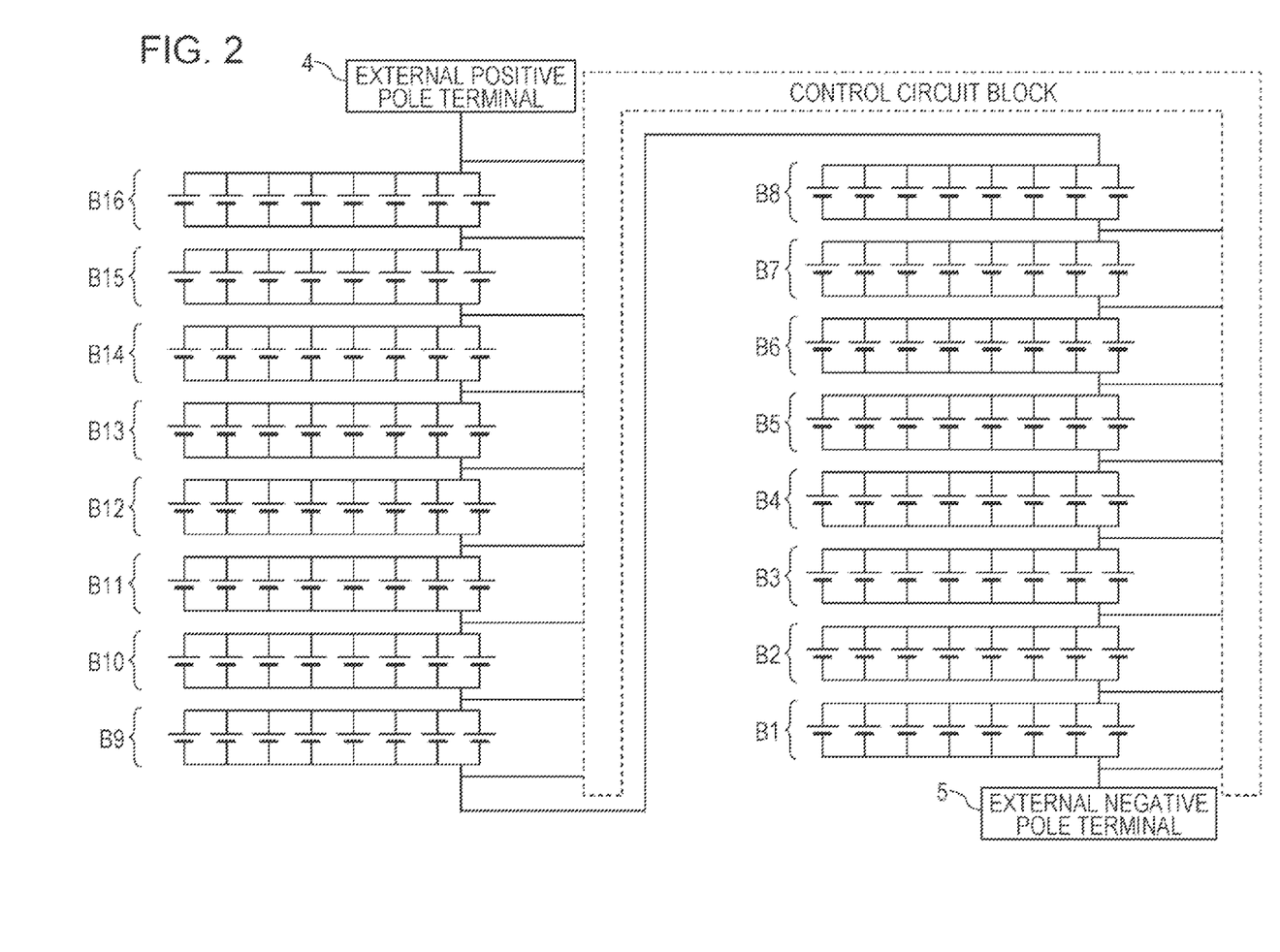
FIG. 2 is a block diagram illustrating the electrical configuration of the power storage module.
Figure 3:
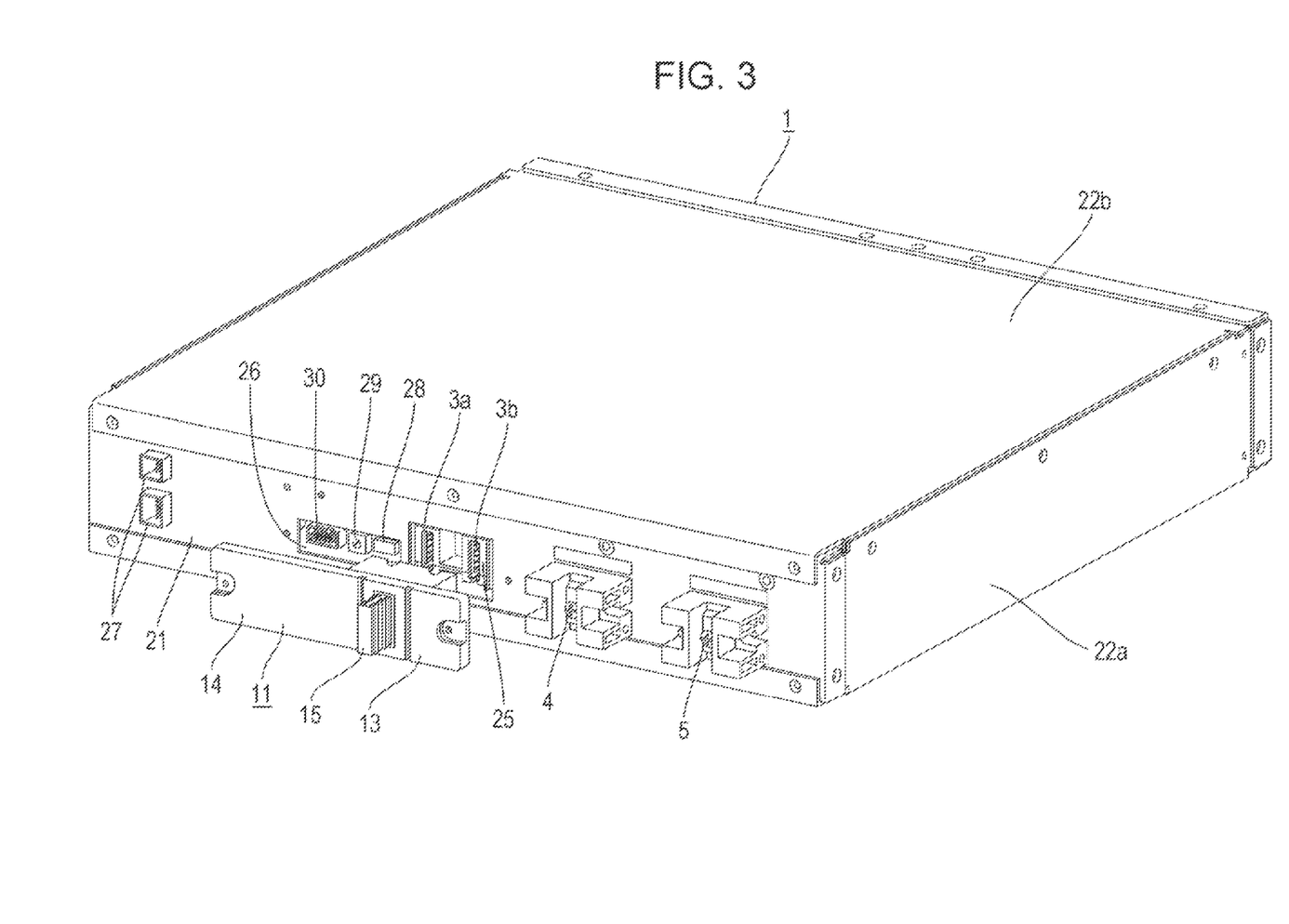
FIG. 3 is a perspective view illustrating a state in which a bus bar has been removed.
Figure 4:
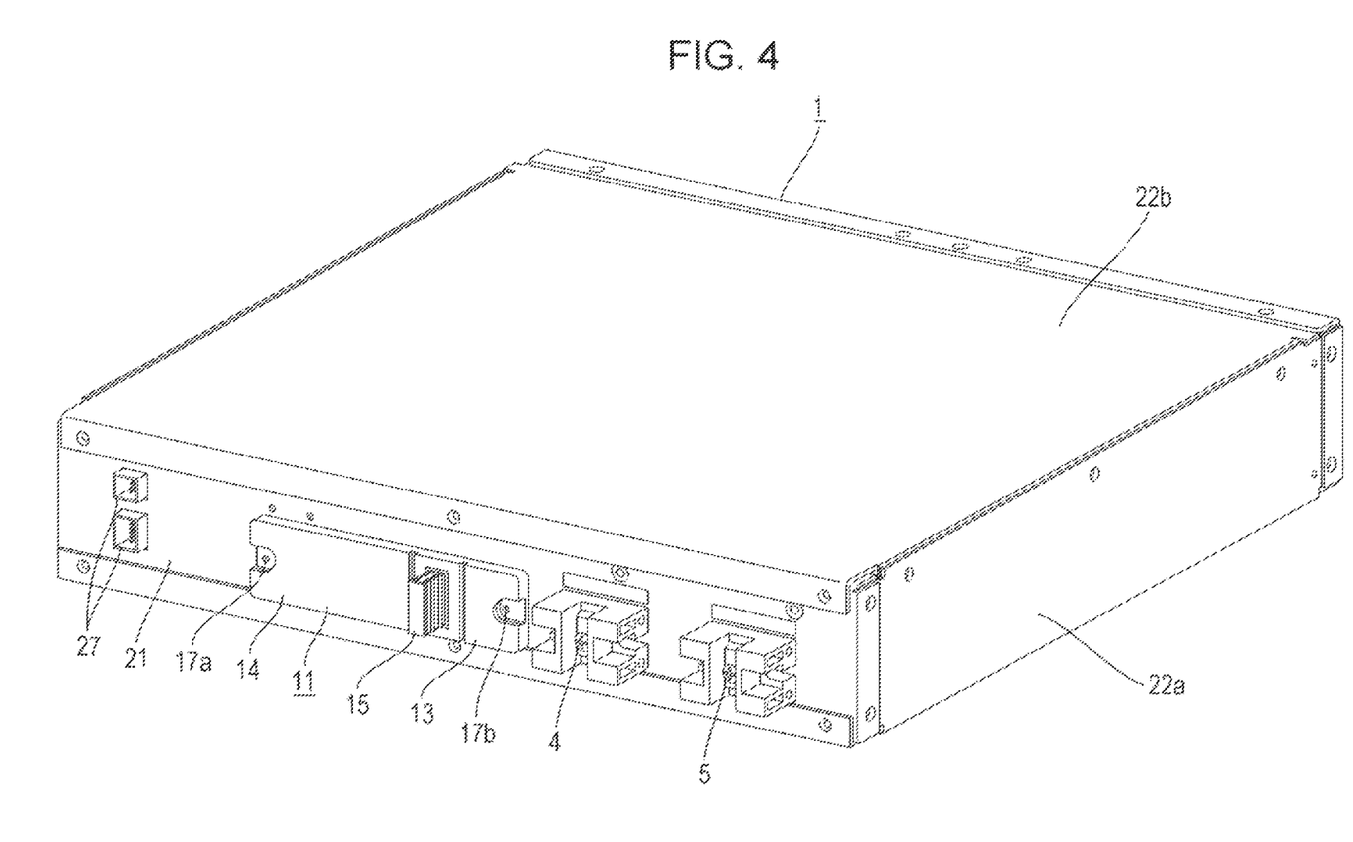
FIG. 4 is a perspective view illustrating a state in which a bus bar has been mounted.

FIG. 2 illustrates an example of the electrical configuration of the power storage module 1. FIGS. 3 and 4 are perspective views illustrating the exterior of the power storage module 1. The exterior case of the power storage module 1 is constituted by a metal-made lower exterior case 22a and a metal-made upper exterior case 22b, which have been subjected to plate sheet processing. The lower exterior case 22a of the case has a box-shaped configuration, and the upper exterior case 22b is provided so as to cover the opening thereof. For the material of the lower exterior case 22a and the upper exterior case 22b, it is preferable that a material having high thermal conductivity and emissivity be used. It is possible to obtain an excellent housing heat dissipation effect, and thus, it is possible to suppress a temperature increase in the case. Since an excellent housing heat dissipation effect is provided, it is possible to minimize or discard the opening part of the case, and thus, a high degree of dust/splash proofing can be realized. For example, the material of the lower exterior case 22a and the upper exterior case 22b is aluminum, an aluminum alloy, copper, or a copper alloy.

Inside the case, as shown in FIG. 2, battery blocks B1 to B16, in each of which 8 batteries are connected in parallel with one another, are connected in series with one another, are housed. One battery block is such that, for example, 8 cylindrical lithium ion secondary batteries are connected in parallel with one another. For example, 16 battery blocks B1 to B16 are each connected to a control block, and charging/discharging is controlled. Charging/discharging is performed through the external positive pole terminal 4 and the external negative pole terminal 5. A voltage of 16×Vbat is output from one power storage module. Vbat is a voltage of one battery block.

A rear surface plate 21 of the case is provided with the external positive pole terminal 4 and the external negative pole terminal 5 for charging/discharging with respect to the power storage module 1. On both sides of the external positive pole terminal 4, short-circuit prevention walls for preventing short-circuit between terminals are provided. On both sides of the external negative pole terminal 5, short-circuit prevention walls for preventing short-circuit between terminals are provided.

In addition, on the rear surface plate 21 of the power storage module 1, windows 25 and 26 are formed in such a manner as to be in proximity with each other. In addition, the rear surface plate 21 is provided with a connector 27 for communication with the controller. Inside the power storage module 1, a control block for performing monitoring of the voltage, the electrical current, and the temperature of the batteries are provided. Information from the control block is transmitted to an external controller through communication. The controller performs charging management, electrical discharge management, management for deterioration suppression, and the like.

For the communication between the control block of the power storage module 1 and the controller, which is performed through a communication connector 27, for example, a serial interface is used. For the serial interface, specifically, a system management (SM) bus or the like is used. For example, an I2C bus can be used. An I2C bus is for synchronous serial communication in which communication is performed using a serial clock (SCL) and two signal lines of bi-directional SDA (serial data).

The connectors 3a and 3b are vertically provided inside a window 26 formed on the rear surface plate 21. The connectors 3a and 3b have two spring contact plates that are arranged opposed with each other, so that plate-shaped projections 12a and 12b of the bus bar 11 are inserted through the window 26 into the opposing gap of the two spring contact plates. In addition, the window 26 is blocked by the cover 14 integral with the support plate 13 of the bus bar 11. Since both the plate-shaped projections 12a and 12b are grasped by the two spring contact plates of the connectors 3a and 3b, it is possible to maintain the state in which the bus bar 11 is inserted with respect to the connectors 3a and 3b.

Figure 5:
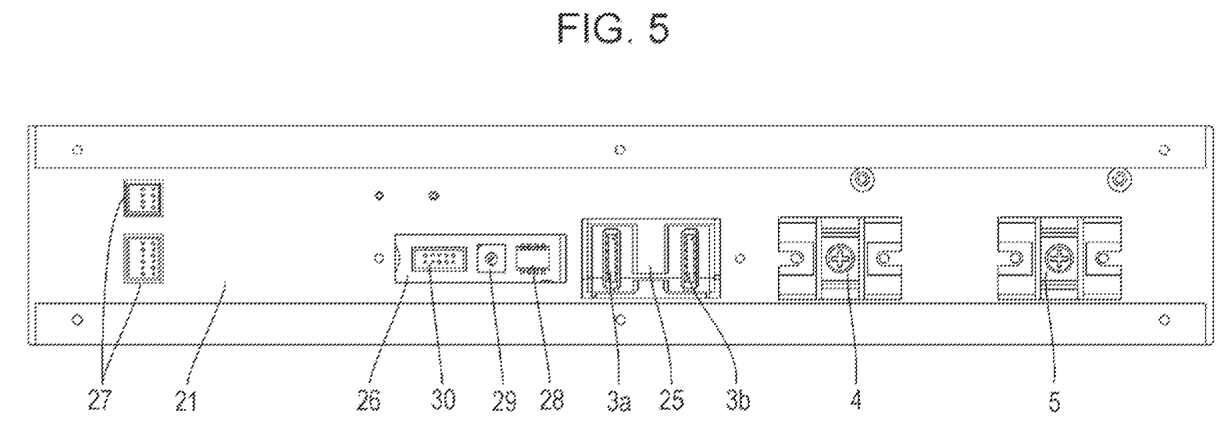
FIG. 5 is a back view of the power storage module.

Electronic parts to be set or connected are arranged inside the window 26 formed on the rear surface plate 21. As shown in FIG. 5, electronic parts include, for example, a slide switch 28, a rotary switch 29, and a JTAG connector 30. An address for the power storage module 1 is set using the rotary switch 29. It is made possible that a plurality of power storage modules 1 are connected and used. In a case where a plurality of the power storage modules 1 are connected, an address for identification is set to each power storage module. An external controller performs a control process on the basis of the address. The slide switch 28 is used to increase the number of addresses that are specified using the rotary switch 29.

The JTAG connector 30 is a standard connector, which has been proposed by JTAG (Joint European Test Action). For the purpose of inspection of a microprocessing unit (MPU), an integrated circuit (IC), and the like of the control block inside the case through the JTAG connector 30, test data is input and output, and also rewriting of the firmware of the internal MPU is performed. For the electronic parts, switching parts, connectors, and the like other than the above-mentioned elements may be used.

Figure 6:
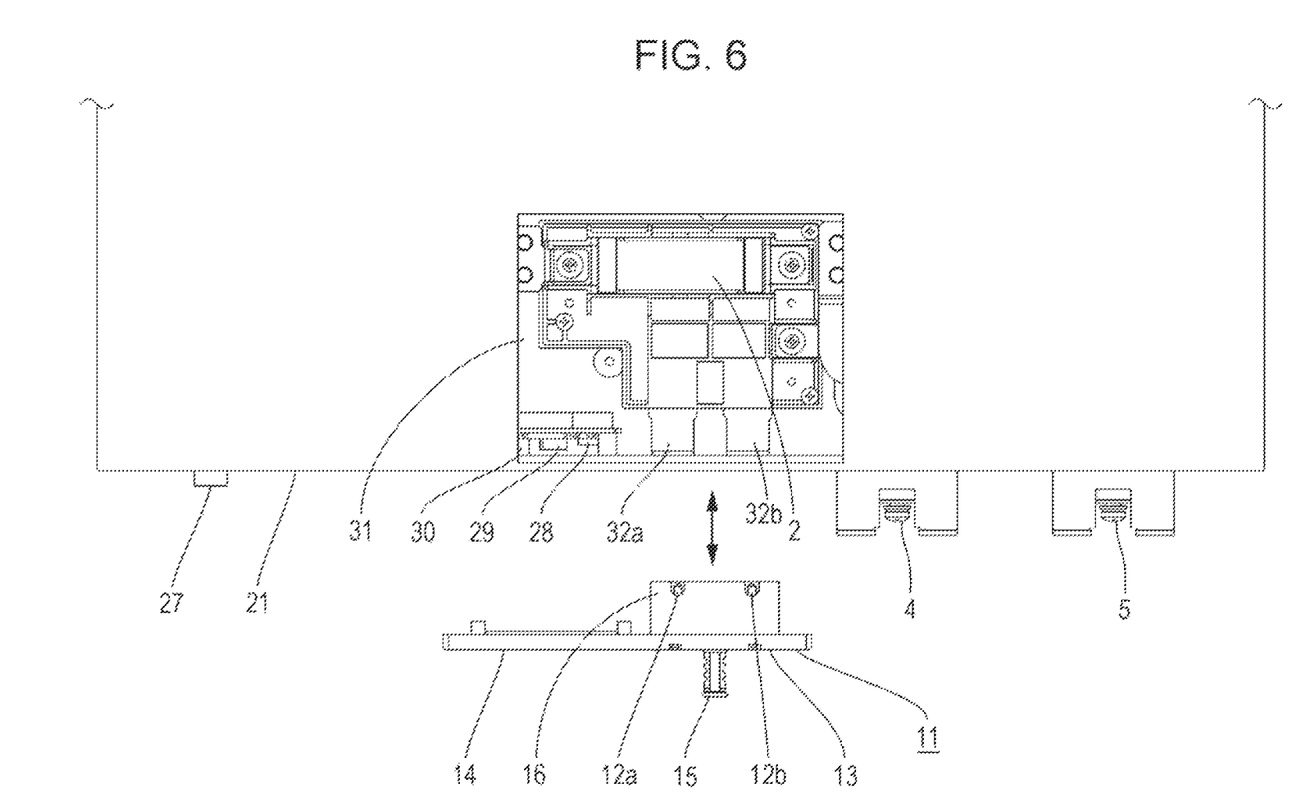
FIG. 6 is a plan view of a power storage module in which a portion of a case has been cut out.
Figure 7A:
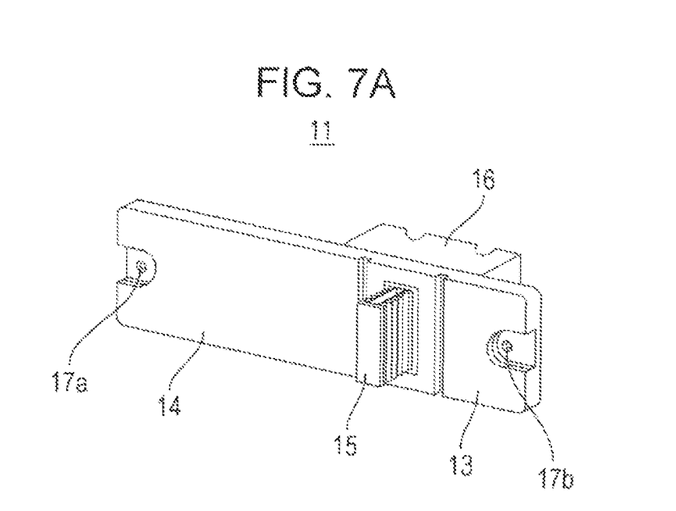
FIGS. 7A and 7B are perspective views of a bus bar.
Figure 7B:
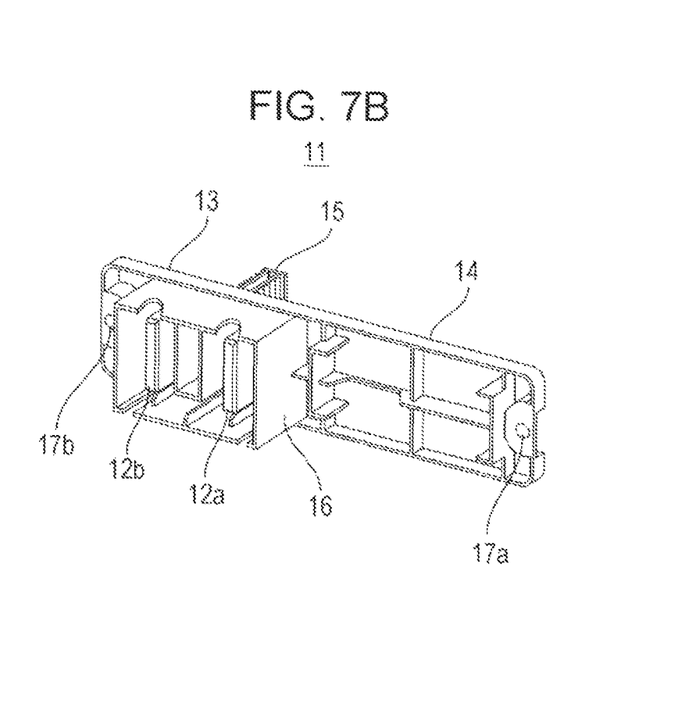

FIG. 6 includes a top plan view of the bus bar 11 and a top plan view in which part of the upper exterior case 22b is cut out. As shown in FIG. 7, the plate-shaped projections 12a and 12b of the bus bar 11 are surrounded by a bus bar cover 16 whose periphery is in the shape of a box. Holes 17a and 17b for screwing are provided at corresponding end portions of the support plate 13 and the cover 14 of the bus bar 11.

A fuse 2 is mounted in the base part 31 that is fixed to the lower exterior case 22a. A bus bar (not shown) inside the case is connected at both ends of the fuse. The connector 3a is provided inside a connector cover 32a, and the connector 3b is provided inside a connector cover 32b.

Figure 8:
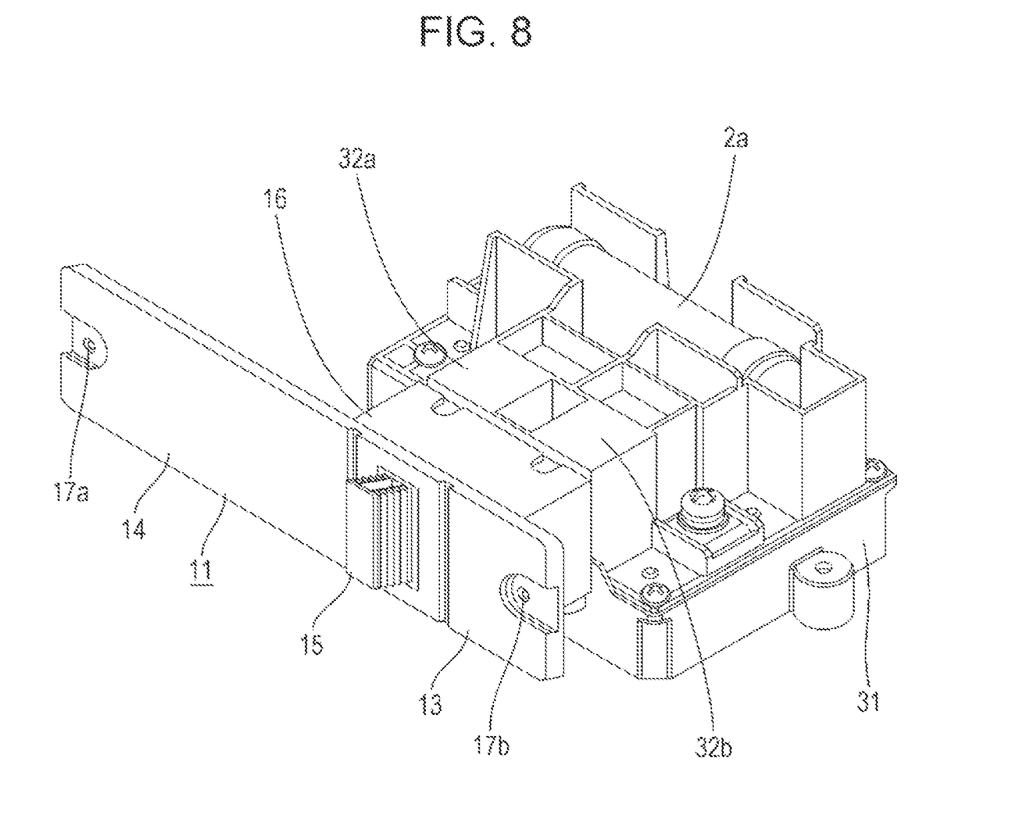
FIG. 8 is a perspective view illustrating a state in which a bus bar has been mounted in a connector.

When the bus bar cover 16 of the bus bar 11 is inserted into the case through the window 26, the connector covers 32a and 32b are inserted into the bus bar cover 16, the plate-shaped projections 12a and 12b are inserted into the slit of the connectors 3a and 3b, and the connectors 3a and 3b are placed in a connected state through the bus bar 11. When the bus bar 11 is pulled out by grasping the knob 15, the connectors 3a and 3b enter a non-connected state. In the non-connected state, the window 26 is opened, and access to the internal electronic parts (the slide switch 28, the rotary switch 29, and the JTAG connector 30) for which setting is performed becomes possible through the window 26. Then, processing, such as setting of addresses, testing of internal ICs, and rewriting of the firmware of the internal MPU, is performed.

According to the above-mentioned present disclosure, by performing the setting operation of electronic parts from outside the case, work efficiency can be improved when compared to operating electronic parts inside the case, and also safety can be increased. In particular, in a case where a plurality of power storage modules are connected in series with one another, the electrical potential of the internal circuit of the power storage module on a higher side increases. In addition, only in a case where the bus bar 11 is removed and the window on the front side of the operation surface is opened, access to the electronic parts becomes possible. In this case, since a high voltage is not output to the external terminal 4, the risk of electric shock due to contacting the external terminal 4 at the time of a setting operation can be eliminated.

In the above-mentioned description, a lithium ion secondary battery is used as a power storage element. However, a secondary battery other than a lithium ion secondary battery may be used. In addition, a power storage element other than a secondary battery, for example, an electric double layer capacitor, may be used. Furthermore, access to the setting unit is blocked by blocking the window by using the cover of the bus bar 11. Alternatively, a configuration is also possible in which the bus bar 11 has a shape by which permission/non-permission of lid opening/closing can be specified and a lid that covers the setting unit does not open unless the bus bar 11 is removed.

The present application is a power storage system that is charged by a power generation apparatus in which the above-mentioned power storage apparatus performs power generation from renewable energy.

The present application is a power storage system that has the above-mentioned power storage apparatus and that supplies electric power to an electronic device that is connected to the power storage apparatus.

The present application is an electronic device that receives the supply of electric power from the above-mentioned power storage apparatus.

The electronic device and the electric power system are implemented as, for example, an electric power supply system for housing. In addition, the electronic device and the electric power system are implemented as a system that provides, in cooperation with an external electric power supply network, efficient supply of electric power.

In addition, the present application is a motor-driven vehicle including a conversion device that receives supply of electric power from the above-mentioned power storage apparatus and converts the electric power into a driving force for the vehicle, and a control device that performs information processing for vehicle control on the basis of the information on the power storage apparatus.

The present application is an electric power system that includes an electric power information transmitting/receiving unit configured to transmit and receive a signal to and from another apparatus through a network and that performs charging/discharging control of the above-mentioned power storage apparatus on the basis of the information received by the transmitting/receiving unit.

The present application is an electric power system that receives supply of electric power from the above-mentioned power storage apparatus or supplies electric power to the power storage apparatus from a power generation apparatus or an electric power network.

"Power Storage System in Housing as Application Example"

Figure 9:
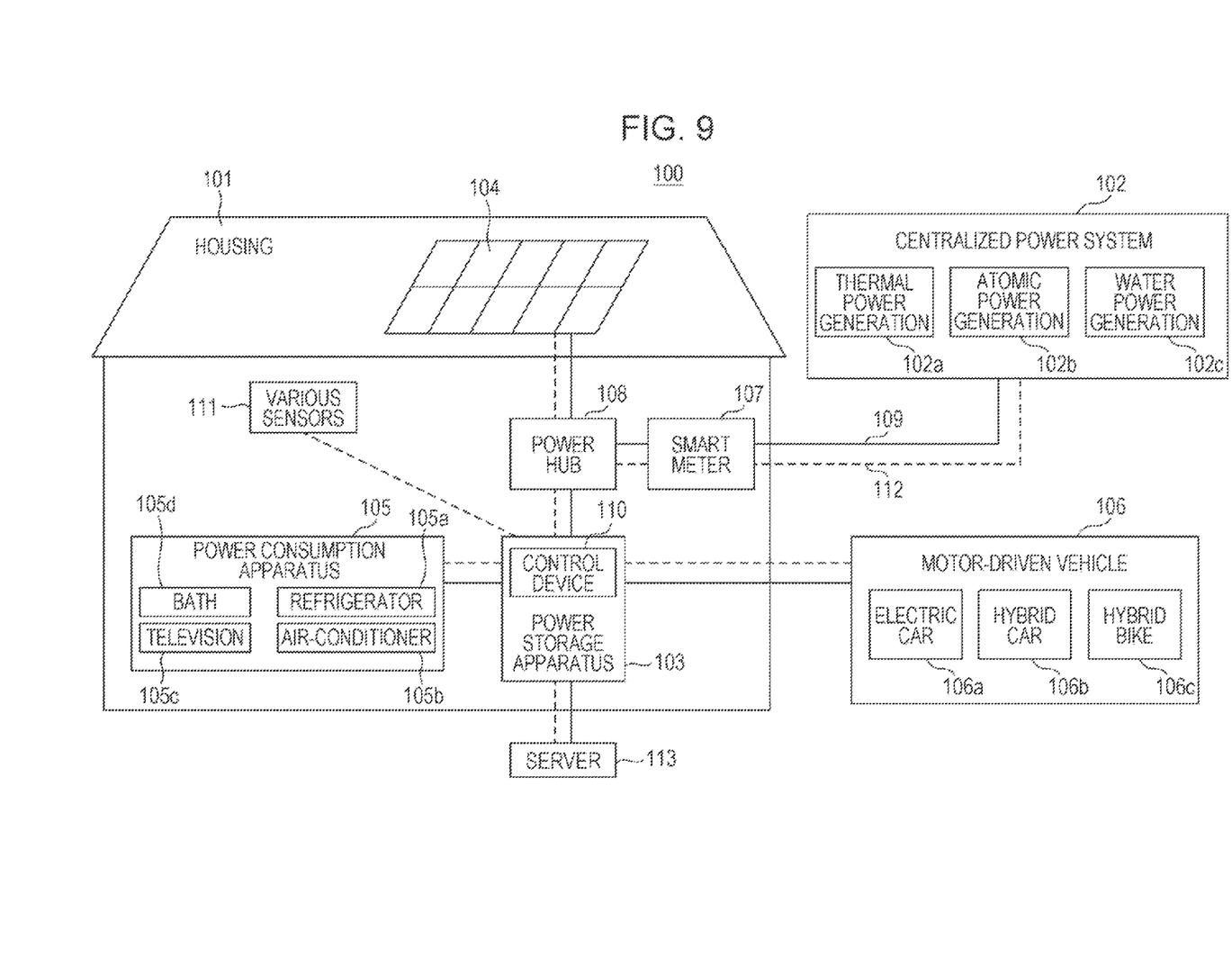
FIG. 9 is a block diagram illustrating an application example of a power storage system.

A description will be given, with reference to FIG. 9, of an example in which the present application is applied to a power storage system for housing. For example, in a power storage system 100 for a housing 101, electric power is supplied from a centralized power system 102, such as thermal power generation 102a, atomic power generation 102b, and wind power generation 102c, to a power storage apparatus 103 through an electric power network 109, an information network 112, a smart meter 107, a power hub 108, and the like. Along with this, electric power is supplied to the power storage apparatus 103 from an independent power supply, such as an in-house power generation device 104. The electric power supplied to the power storage apparatus 103 is stored. By using the power storage apparatus 103, electric power used in the housing 101 is supplied. Not limited to the housing 101, the same power storage system can be used with regard to a building.

The housing 101 is provided with the power generation device 104, a power consumption apparatus 105, a power storage apparatus 103, a control device 110 that controls each device, a smart meter 107, and sensors 111 that obtain various information. The devices are connected to one another through the electric power network 109 and the information network 112. For the power generation device 104, a solar battery, a fuel battery, or the like is used, and the generated electric power is supplied to the power consumption apparatus 105 and/or the power storage apparatus 103. Examples of the power consumption apparatus 105 include a refrigerator 105a, an air-conditioning device 105b, a television receiver 105c, and a bath 105d. In addition, the power consumption apparatus 105 includes a motor-driven vehicle 106. Examples of the motor-driven vehicle 106 include an electric automobile 106a, a hybrid car 106b, and an electric bicycle 106c.

The above-mentioned power storage apparatus of the present application is applied to the power storage apparatus 103. The power storage apparatus 103 is constituted by a secondary battery or a capacitor. The power storage apparatus 103 is, for example, constituted by a lithium-ion battery. The lithium-ion battery may be of a stationary type or may be that used in the motor-driven vehicle 106. The smart meter 107 has functions of measuring the used amount of commercial electric power and transmitting the measured used amount to an electric power company. The electric power network 109 may be any one of DC power feeding, AC power feeding, and noncontact supply of electricity, or may be such that two or more of them are combined.

Examples of various sensors 111 include a human detection sensor, an illumination sensor, an object detection sensor, a power consumption sensor, a vibration sensor, a contact sensor, a temperature sensor, and an infrared sensor. The information obtained by the various sensors 111 is transmitted to the control device 110. The state of the weather conditions, the state of a person, and the like are understood on the basis of the information from the sensors 111, and the power consumption apparatus 105 can be automatically controlled to minimize energy consumption. In addition, it is possible for the control device 110 to transmit information on the housing 101 to an external electric power company and the like through the Internet.

Processing, such as branching of electric power lines and DC/AC conversion, is performed by using a power hub 108. Examples of a communication scheme for an information network 112 that is connected with the control device 110 include a method of using a communication interface, such as UART (Universal Asynchronous Receiver-Transceiver: transmission and reception circuit for asynchronous serial communication), and a method of using a sensor network based on a wireless communication standard, such as Bluetooth, ZigBee, or WiFi. The Bluetooth method can be applied to multimedia communication, so that one-to-many connection communication can be performed. ZigBee uses the physical layer of IEEE (Institute of Electrical and Electronics Engineers) 802.16.4. IEEE 802.16.4 is the title of the short-distance wireless network standard called personal area network (PAN) or wireless (W) PAN.

The control device 110 is connected to an external server 113. The server 113 may be managed by one of the housing 101, an electric power company, and a service provider. The information that is transmitted and received by the server 113 is, for example, information on power consumption information, life pattern information, an electric power fee, weather information, natural disaster information, and electricity transaction. These pieces of information may be transmitted and received from an power consumption apparatus (for example, television receiver) inside a household. Alternatively, the pieces of information may be transmitted and received from an out-of-home device (for example, a mobile phone, etc.). These pieces of information may be displayed on a device having a display function, for example, a television receiver, a mobile phone, or a personal digital assistant (PDA).

The control device 110 that controls each unit is constituted by a central processing unit (CPU), a random access memory (RAM), a read only memory (ROM), and the like. In this example, the control device 110 is stored in the power storage apparatus 103. The control device 110 is connected to the power storage apparatus 103, the in-house power generation device 104, the power consumption apparatus 105, the various sensors 111, and the server 113 through the information network 112, and has functions of adjusting the use amount of the commercial electric power, and the amount of power generation. In addition, the control device 110 may have a function of performing electricity transaction in the electric power market.

As described above, not only the centralized power system 102 in which power is thermal power 102a, atomic power 102b, wind power 102c, or the like, but also the generated power of the in-house power generation device 104 (solar power generation, wind power generation) can be stored in the power storage apparatus 103. Therefore, even if the generated power of the in-house power generation device 104 varies, it is possible to perform control such that the amount of electric power to be sent to the outside is made constant or electric discharge is performed by only a necessary amount. For example, usage is possible in which electric power obtained by the solar power generation is stored in the power storage apparatus 103, late night power whose fee is low during nighttime is stored in the power storage apparatus 103, and the electric power stored by the power storage apparatus 103 is discharged and used in a time zone in which the fee during daytime is high.

In this example, an example has been described in which the control device 110 is stored in the power storage apparatus 103. Alternatively, the control device 110 may be stored in the smart meter 107 or may be configured singly. In addition, the power storage system 100 may be used by targeting a plurality of households in a block of apartments or may be used by targeting a plurality of single-family detached houses.

"Power Storage System in Vehicle as Application Example"

Figure 10:
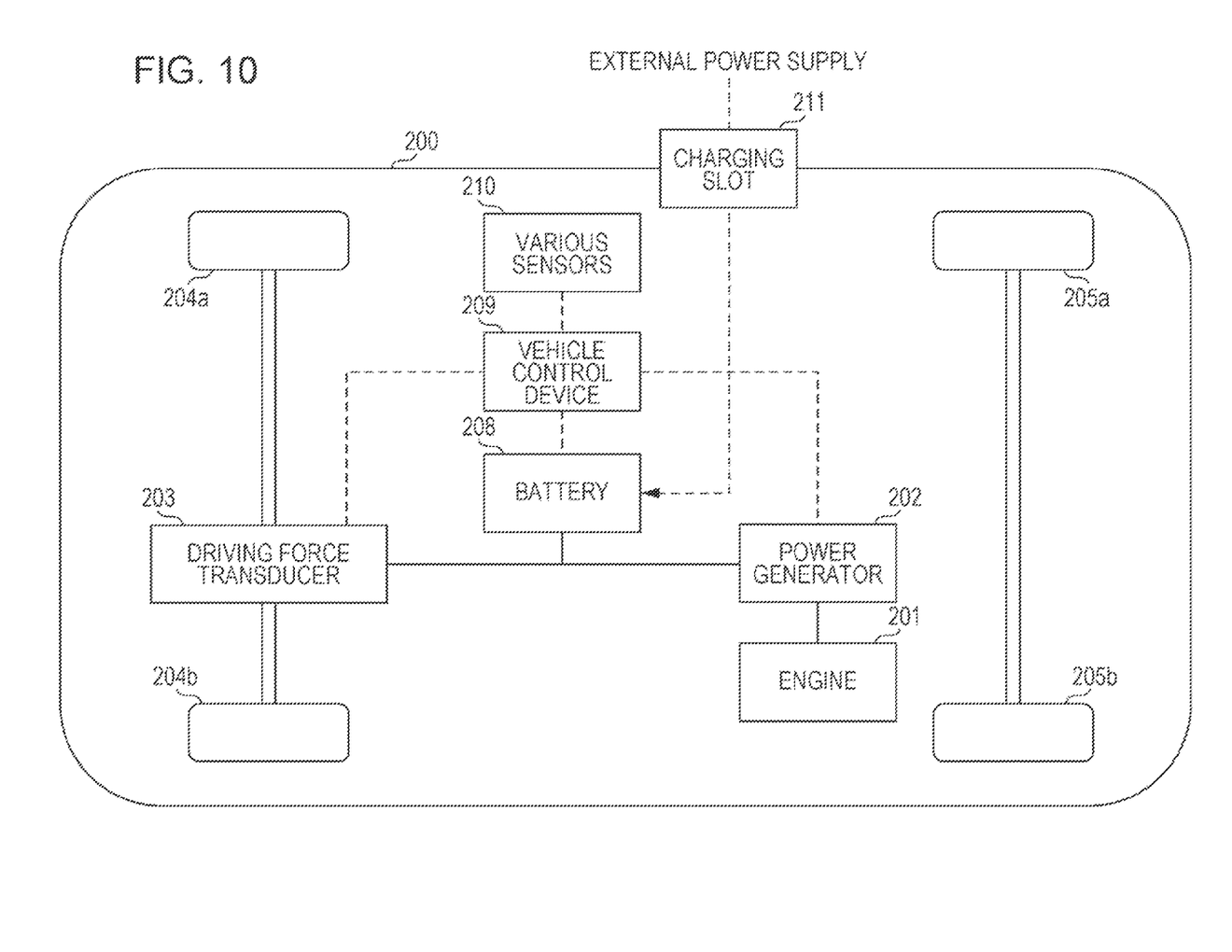
FIG. 10 is a block diagram illustrating an application example of a power storage system.

A description will be given, with reference to FIG. 10, of an example in which the present application is applied to a power storage system for vehicle. FIG. 10 schematically shows an example of the configuration of a hybrid vehicle adopting a series hybrid power system to which the present application is applied. A series hybrid power system is a car that runs using an electric power driving force transducer by using electric power generated by a power generator that is driven by an engine or by using electric power that is temporarily stored in a battery.

A hybrid vehicle 200 is mounted with an engine 201, a power generator 202, an electric power driving force transducer 203, a driving wheel 204a, a driving wheel 204b, a wheel 206a, a wheel 206b, a battery 208, a vehicle control device 209, various sensors 210, and a charging slot 211. The above-mentioned power storage apparatus of the present application is applied to the battery 208.

The hybrid vehicle 200 runs by using the electric power driving force transducer 203 as a power source. An example of the electric power driving force transducer 203 is a motor. The electric power driving force transducer 203 operates using the electric power of the battery 208, and the rotational force of the electric power driving force transducer 203 is transferred to the driving wheels 204a and 204b. By using direct current-alternating current (DC-AC) or inverse conversion (AC-DC conversion) at a necessary place, the electric power driving force transducer 203 can use any of an AC motor and a DC motor. The various sensors 210 control the engine revolution speed through the vehicle control device 209 or controls the opening (throttle opening) of a throttle valve (not shown). The various sensors 210 include a speed sensor, an acceleration sensor, an engine revolution speed sensor, and the like.

The rotational force of the engine 201 is transferred to the power generator 202, and the electric power generated by the power generator 202 by using the rotational force can be stored in the battery 208.

When a hybrid vehicle decelerates by a braking mechanism (not shown), the resistance force at the time of the deceleration is added as a rotational force to the electric power driving force transducer 203, and the regenerative electric power that is generated by the electric power driving force transducer 203 by using the rotational force is stored in the battery 208

The battery 208, as a result of being connected to an external power supply of the hybrid vehicle, receives supply of electric power by using a charging slot 211 as an input slot from the external power supply, and can store the received electric power.

Although not shown in the figures, the present application may include an information processing apparatus that performs information processing for vehicle control on the basis of information on a secondary battery. Examples of such information processing apparatuses include an information processing apparatus that performs display of the remaining amount of a battery on the basis of the information on the remaining amount of the battery.

In the foregoing, a description has been given by using, as an example, a series hybrid car that runs using a motor by using electric power generated by a power generator that is driven by an engine or by using electric power that had once been stored in a battery. However, the present application can be effectively applied to a parallel hybrid car in which the outputs of both the engine and the motor are used as a driving source and in which switching between three methods, that is, running using only an engine, running using only a motor, and running using an engine and a motor, is performed as appropriate. In addition, the present application can be effectively applied to a so-called motor-driven vehicle that runs by driving using only a driving motor without using an engine.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A power storage apparatus having a battery unit housed in a case, the power storage apparatus comprising:
 external terminals of positive and negative poles for providing, from outside the case, electrical connection to corresponding positive and negative poles of the battery unit;
 electronic parts configured to adjust parameters of the power storage apparatus;
 a first window included within a side of the case configured to enable access to the electronic parts;
 a second window located adjacent to the first window configured to enable access to a first connector and a second connector; and
 a connection unit removably coupled to the case and configured to cover the first window and the second window, the connection unit including a projection configured to:
  i) complete a connection with the battery unit at the first connector and the second connector and prevent the parameters of the power storage apparatus from being adjusted via the electronic parts when the connection unit is coupled to the case, and
  ii) cut a connection with the battery unit at the first connector and the second connector when the connection unit is removed from the case enabling the electronic parts to be accessed.

2. The power storage apparatus according to claim 1, wherein the electronic parts include a switch unit configured to set, when the electronic parts are connected to another device, an address of the device.

3. The power storage apparatus according to claim 1, further comprising a communication terminal for performing communication with an external control device.

4. The power storage apparatus according to claim 1, further comprising a power generation device configured to charge the battery unit using renewable energy.

5. A power storage system comprising the power storage apparatus according to claim 1, wherein electric power is supplied to an electronic device that is connected to the power storage apparatus.

6. An electronic device that receives supply of electric power from the power storage apparatus according to claim 1.

7. A motor-driven vehicle comprising:
a conversion device that receives supply of electric power from the power storage apparatus according to claim 1 and that converts the electric power into a driving force for a vehicle; and
a control device that performs information processing for vehicle control on the basis of information on the power storage apparatus.

8. An electric power system comprising an electric power information transmitting/receiving unit configured to transmit and receive a signal to and from another device through a network,
wherein charging/discharging control of the power storage apparatus according to claim 1 is performed on the basis of information received by the transmitting/receiving unit.

9. An electric power system that receives supply of electric power from the power storage apparatus according to claim 1 or that supplies electric power to the power storage apparatus from a power generation device or an electric power network.

10. The power storage apparatus according to claim 1, wherein the electronic parts include at least one of a slide switch and a rotary switch to configure an address for the power storage apparatus.

11. A power storage apparatus having a battery unit and electronic parts housed in a same case, the power storage apparatus comprising:
external terminals of positive and negative poles for providing, from outside the case, electrical connection to corresponding positive and negative poles of the battery unit; and
a connection unit configured to switch a connected state between at least one of the external terminals of both the poles and the battery unit;
a first window included within a side of the case configured to enable access to the electronic parts; and
a second window located adjacent to the first window configured to enable access to a first connector and a second connector,
wherein the connection unit is configured to be removably coupled to the first connector and the second connector of the case to cover the first window preventing access to the electronic parts and preventing parameters of the power storage apparatus from being adjusted via the electronic parts when the connection state is connected and enabling access to the electronic parts by uncovering the first window when the connection state is disconnected.

12. The power storage apparatus according to claim 11,
wherein the external terminals of both the poles are mounted in the case,
the first conductor is connected to a side of the battery unit corresponding to at least one of the external terminals of both the poles and that is mounted in the case, and
the second conductor is connected to at least one of the external terminals of both the poles and that is mounted in the case; and
the power storage apparatus further comprising a cover that is formed integrally with the connection unit configured to cover the first window and block access to the electronic parts,
wherein the connection unit is used to switch between the connected state and the disconnected state between the first conductor and the second conductor,
the electronic parts are mounted in the vicinity of the first and second conductors, and
the connection unit is configured to enable access to the electronic parts when the first and second conductors are placed in the disconnected state.

13. The power storage apparatus according to claim 12, wherein a fuse is inserted into a path constituted by the first conductor, the connection unit, the second conductor, and one of the external terminals of both the poles.

14. A connection apparatus comprising:
first and second conductors that are inserted into a power-supply line;
a connection unit by which a state in contact with the first and second conductors and a state in separation from at least one of the first and second conductors is switched;
a first window configured to enable access to electronic parts;
a second window located adjacent to the first window configured to enable access to the first connector and the second connector; and
a cover that is formed integrally with a support part that supports the connection unit and that covers the first window including the electronic parts and the second window including the first and second conductors thereby preventing parameters configurable by the electronic parts from being adjusted when the connection unit is separated from at least one of the first and second conductors.

15. The connection apparatus according to claim 14, wherein the first and second conductors are vertically provided so as to have a slit,
the connection unit causes a conduction plate to be bent approximately in the shape of U, and leg parts of the conduction plate are configured detachable in the slit of the first and second conductors,
a base part of the connection unit is fixed to one surface of a plate-shaped support body, and an extension part of the plate-shaped support body forms the cover, and
a knob is provided on the other surface of the plate-shaped support body.

* * * * *